(12) United States Patent
Haggerty

(10) Patent No.: US 8,114,194 B2
(45) Date of Patent: Feb. 14, 2012

(54) GAS SEPARATION VESSEL WITH INTERNAL PARTITION

(75) Inventor: Sean Haggerty, North Haven, CT (US)

(73) Assignee: On Site Gas Systems, Inc., Newington, CT (US)

( * ) Notice: Subject to any disclaimer, the term of this patent is extended or adjusted under 35 U.S.C. 154(b) by 264 days.

(21) Appl. No.: 12/261,537

(22) Filed: Oct. 30, 2008

(65) Prior Publication Data
US 2009/0314159 A1 Dec. 24, 2009

Related U.S. Application Data

(60) Provisional application No. 61/075,114, filed on Jun. 24, 2008.

(51) Int. Cl.
B01D 53/02 (2006.01)
(52) U.S. Cl. .................................. 95/90; 96/108; 96/121
(58) Field of Classification Search ........ 95/90; 96/108, 96/121
See application file for complete search history.

(56) References Cited

U.S. PATENT DOCUMENTS

| | | | | | |
|---|---|---|---|---|---|
| 1,930,357 | A | * | 10/1933 | Frederick | 96/121 |
| 1,989,206 | A | * | 1/1935 | Magill | 96/108 |
| 2,080,066 | A | * | 5/1937 | Sheppard et al. | 312/31 |
| 2,226,045 | A | * | 12/1940 | Baldwin | 55/419 |
| 2,400,180 | A | * | 5/1946 | Venable | 96/139 |
| 3,064,819 | A | * | 11/1962 | Jones | 210/266 |
| 3,070,937 | A | * | 1/1963 | Bub | 96/121 |
| 3,505,794 | A | * | 4/1970 | Nutter et al. | 55/487 |
| 5,145,494 | A | * | 9/1992 | Sowinski | 95/142 |
| 5,422,081 | A | * | 6/1995 | Miyagi et al. | 422/170 |
| 5,716,427 | A | * | 2/1998 | Andreani et al. | 95/90 |
| 5,814,129 | A | * | 9/1998 | Tentarelli | 95/90 |
| 6,059,863 | A | * | 5/2000 | Monereau et al. | 96/152 |
| 6,152,992 | A | * | 11/2000 | Gemmingen | 95/96 |
| 6,368,393 | B1 | * | 4/2002 | Hironaka | 96/111 |
| 6,375,716 | B1 | * | 4/2002 | Burchell et al. | 95/114 |
| 6,506,234 | B1 | * | 1/2003 | Ackley et al. | 95/96 |
| 6,638,339 | B2 | * | 10/2003 | Dallas et al. | 95/90 |
| 6,770,120 | B2 | * | 8/2004 | Neu et al. | 95/96 |
| 6,966,936 | B2 | * | 11/2005 | Yamasaki et al. | 55/385.2 |
| 2002/0194991 | A1 | * | 12/2002 | Olsson et al. | 95/118 |
| 2005/0045041 | A1 | * | 3/2005 | Hechinger et al. | 96/121 |
| 2006/0236867 | A1 | * | 10/2006 | Neary | 96/121 |
| 2006/0288872 | A1 | * | 12/2006 | Nakano | 96/108 |
| 2008/0041226 | A1 | * | 2/2008 | Hiltzik et al. | 95/90 |
| 2008/0272054 | A1 | * | 11/2008 | Schlegel et al. | 210/661 |

* cited by examiner

Primary Examiner — Robert J Hill, Jr.
Assistant Examiner — Christopher P Jones
(74) Attorney, Agent, or Firm — Michaud-Kinney Group LLP

(57) ABSTRACT

A gas separation vessel has a vessel shell and a partition therein. A first bed support is mounted between the partition and the shell, and a second bed support is mounted within the partition to define a second bed space. First and second ports on the vessel shell beneath the bed supports permit gas flow between the bed spaces and the exterior of the vessel shell. A separation medium is placed in the bed spaces. A feed gas is introduced into the vessel to flow through the first bed and then through the second bed to separate at least one component of the feed gas from the other intermixed gases. Output gas is then collected from the vessel. The vessel may have a L:D ratio of not more than 4:1.

13 Claims, 1 Drawing Sheet

GAS SEPARATION VESSEL WITH INTERNAL PARTITION

CROSS-REFERENCE TO RELATED APPLICATION

This application claims the benefit of U.S. provisional application No. 61/075,114, filed Jun. 24, 2008, which is hereby incorporated herein by reference, in its entirety.

FIELD OF THE INVENTION

This invention relates to gas separation vessels, and in particular to gas separation vessels that are made for use with beds of separation mediums.

BACKGROUND

The various components of gas mixtures can be separated from each other by flowing the mixture in contact with a separation medium. The separation medium may comprise a selectively adsorbent material and/or a filter material. The separation medium is disposed in a vessel through which a feed gas mixture is flowed, and the separation medium selectively adsorbs or blocks one component of the mixture and allows another component to pass through. As a result, the outflow product gas from the vessel has a lower proportion of the adsorbed or blocked gas than the feed gas mixture. For example, when the feed gas mixture is air and the separation medium selectively adsorbs oxygen, the outflow product gas is nitrogen-rich relative to the feed gas mixture. The separation process is typically carried out at an elevated gas pressure inside the vessel. When an adsorbent separation medium is "spent," i.e., when the adsorbent material has adsorbed all that it can adsorb, the adsorbent material can be recharged by desorbing and removing the adsorbed gas. In pressure swing adsorption (PSA) systems, the desorption process includes lowering the pressure inside the vessel to facilitate desorption of the adsorbed gas molecules.

The adsorbent selectivity of a separation medium is determined at least in part the size of the pores in the separation medium. Accordingly, gas molecules with a kinetic diameter less than or equal to the pore size of the separation medium are retained, or adsorbed, on or by the separation medium while gas molecules of larger diameters pass through the separation medium. The separation medium, in effect, sieves the gas according to its molecular size and is therefore sometimes referred to as a molecular sieve. A molecular sieve for the production of nitrogen-rich gas from air should have a pore structure with a diameter comparable to the kinetic diameter of oxygen. Conversely, some zeolite molecular sieve materials are known for selectively adsorbing nitrogen from air. Accordingly, nitrogen is adsorbed by the zeolite molecular sieve while oxygen passes through. Carbonaceous materials are also known for use as adsorbents (e.g., activated carbon) for adsorbing carbon species such as oil vapors from air to produce clean air as an output product gas, and as molecular sieve materials (Carbon Molecular Sieves (CMS)) for nitrogen generation from air.

As seen in FIG. 1, a prior art vessel 100 for use in generating nitrogen gas from air in a PSA process is configured as an upright oblong cylinder 102 having rounded end portions 104, 106 welded thereto, with a feed gas inlet 108 at the top rounded end and a product gas outlet 110 at the bottom rounded end. There is a bottom bed support screen 114 near the bottom of the vessel 100, at the weld line for the bottom rounded end portion 104, and a top bed screen 116 near the top of the vessel, at the weld line for the top rounded end portion 106. A gas flow path through the vessel, indicated by arrows 120, proceeds axially in a single, downward direction from the feed gas inlet to the product gas outlet. Such vessels are typically more than six feet tall and provide bed spaces that have large length-to-diameter (L:D) ratios (i.e., L:D greater than 4:1)(based on a length $L_{PA}$ (along the central axis $A_{PA}$ of the cylinder) from the bottom bed support screen 114 to the top bed screen 116, which corresponds to the length of the cylinder portion, excluding the rounded ends, and a specific diameter $D_{PA}$). A prior art single bed vessel 100 is configured to have a L:D ratio of greater than 4:1 because such a configuration is believed to favor gas permeation through the bed of separation medium therein and to prevent "channeling," i.e., to prevent the flow of gas around the bed or through channels in the bed as opposed to permeation through the bed.

SUMMARY OF THE INVENTION

The present invention resides in one aspect in a gas separation vessel that includes a vessel shell and a partition inside, and mounted on, the vessel shell. There is a first bed support mounted on the vessel shell between the partition and the vessel shell to define a first bed space, the first bed support being gas permeable. There is also a second bed support mounted on the vessel shell and within the partition to define a second bed space, the second bed support being gas permeable. A first gas port is located on the vessel shell beneath the first bed support, and a second gas port is located on the vessel shell beneath the second bed support. The first gas port is configured to permit gas flow between the first bed space and the exterior of the vessel shell, and the second gas port is configured to permit gas flow between the second bed space and the exterior of the vessel shell.

The present invention resides in another aspect in a method of separating intermixed gases. The method includes providing a gas separation vessel as described herein, with a first bed of separation medium in the first bed space and a second bed of separation medium in the second bed space. A feed gas that comprises intermixed gases is introduced into the gas separation vessel to flow through the first bed and then through the second bed to enable the separation medium to preferentially retain at least one of the intermixed gases while preferentially permitting a the remaining gas portion of the intermixed gases to flow therethrough. Output gas, which contains a smaller proportion of the retained gas than the feed gas, can then be collected from the vessel.

DETAILED DESCRIPTION OF THE INVENTION

The present invention provides a vessel that is useful for gas separation processes, such as pressure swing adsorption (PSA) processes. The vessel has an internal partition that divides the interior of the vessel into two spaces where beds of separation medium can reside. The internal partition permits the vessel to be configured to have a low profile relative to prior art gas separation vessels.

Figure 1:
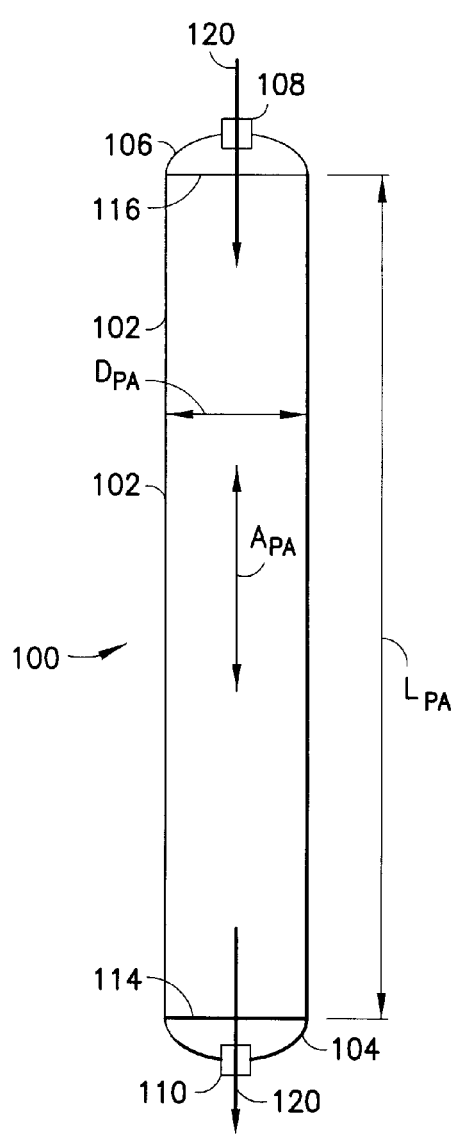
FIG. 1 is a schematic cross-sectional view of a prior art gas separation vessel.
Figure 2:
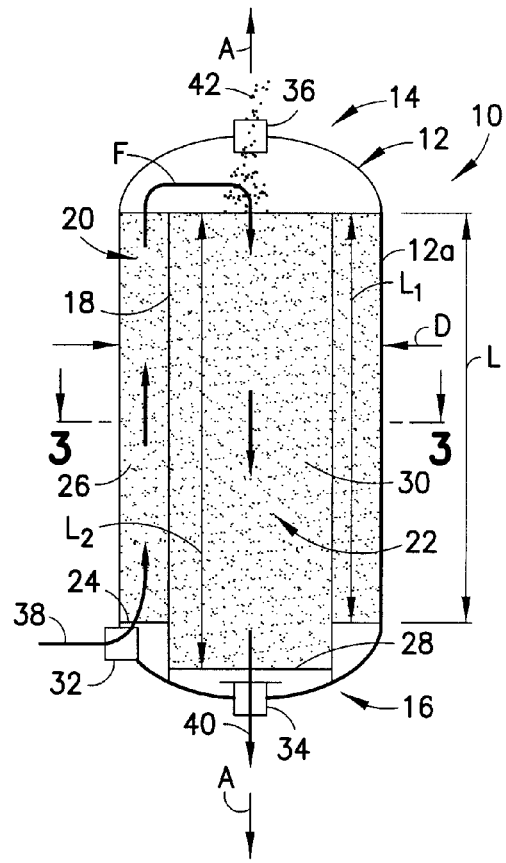
FIG. 2 is a schematic cross-sectional view of a gas separation vessel according to an illustrative embodiment of the present invention.
Figure 3:
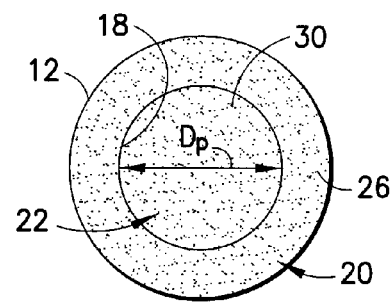
FIG. 3 is a schematic cross-sectional view of the vessel of FIG. 2, taken along line A-A

In one particular embodiment, a gas separation vessel indicated generally by the numeral 10 in FIG. 2, includes a vessel shell 12. The vessel shell 12 has a central cylindrical portion 12a and two rounded ends: a top rounded end 14 and a bottom rounded end 16, which may comprise end caps that are welded to the central cylindrical portion. The vessel 10 has a generally cylindrical configuration with the vessel shell 12 having a circular cross-sectional configuration as seen in FIG. 3. The central cylindrical portion 12a has a length L (along the central axis A of the center cylindrical portion). Inside the vessel shell 12 there is a partition 18 that is mounted to the bottom rounded end 16 of the vessel shell 12 in a gas-impermeable joint between the partition and the vessel shell. The partition 18 extends upward to be level with the top of the central cylindrical portion and separates a first bed space 20 from a second bed space 22 inside the central cylindrical portion of the vessel 10. The partition 18 also has a cylindrical configuration with two ends and a circular cross-sectional configuration also seen in FIG. 3.

A first bed support 24 is mounted in the vessel shell 12 between the partition 18 and the vessel shell 12. The first bed support is gas permeable, i.e., it is configured to permit gas flow therethrough, but it is also configured to prevent the passage of a separation medium therethrough. For example, the first bed support 24 may comprise a fine mesh screen. The first bed support 24 is annular in configuration with an outer periphery that engages the vessel shell 12 and an inner periphery that engages the partition 18. Together, the vessel shell 12, the first bed support 24 and the partition 18 define the first bed space 20.

A second bed support 28 is mounted in the vessel shell within the partition. The second bed support 28 is gas permeable and configured to prevent the passage of a separation medium therethrough. The second bed support 28 is circular with a periphery that engages the inside of the partition. Together, the second bed support 28 and the partition 18 define the second bed space 22

The first bed space 20 has an annular configuration that encircles, and is concentric with, the second bed space 22.

The first bed support 24 is located along axis A at the transition between the center cylindrical portion 12a and the bottom rounded end 16 (e.g., at the weld line of the bottom rounded end to the center cylindrical portion). However, the second bed support 28 is situated in the bottom rounded end 16, below the transition between the center cylindrical portion 12a and the bottom rounded end 16. Therefore, the length L2 of the second bed space 22 (from the second bed support 28 to the top of the partition 18) is greater than the length L1 of the first bed space 20.

While L2 is greater than L1 in the vessel 10 because the second bed support 28 is lower than the first bed support 24 relative to the top edge of the partition 18, the invention is not limited in this regard. Accordingly, in other embodiments, the first bed support 24 may be level with, or higher than, the second bed support 28 along the axis A, so the length L1 of the first bed space 20 may be the same as, or may be greater than, the length L2 of the second bed space 22.

The partition 18 and the first and second bed supports 24, 28 are configured so that the volume of the first bed space 20 (bounded by the vessel shell 12, the first bed support 24, the partition 18 and a plane across the top of the partition 18) is about the same as the volume of the second bed space 22 (bounded by the second bed support 28, the partition 18 and a plane across the top of the partition). However, the invention is not limited in this regard, and in other embodiments, the first bed space 20 may have a different volume from the second bed space 22.

A first gas port 32 located in the vessel shell 12 is configured to admit gas flow into the first bed space 20 from outside the vessel shell, and a second gas port 34 in the vessel shell 12 is configured to admit gas flow out from the second bed space 22 to outside the vessel shell. Accordingly, as seen in FIG. 2, there is a gas flow path F (indicated by bold arrows) that extends from the first gas port 32, upwards around the partition 18, and then downward to the second gas port 34. Preferably, as shown in FIG. 2, the first gas port 32 and the second gas port 34 are beneath the first bed support 24 and the second bed support 28, respectively, and the gas flow path F extends through the first and second bed supports and through the first bed space 20 and the second bed space 22. In addition, the first gas port 32 and the second gas port 34 are both positioned near the same end of the vessel shell 12 (i.e., both closer to one end than to the other, along the axis A), so that the vessel 10 can easily be connected to a source (not shown) of feed gas mixture 38 and to a receiver (not shown) of product gas 40 that can be positioned close to each other, and the need for connective tubing is significantly reduced relative to a gas separation vessel having gas ports at opposite ends of the vessel.

The cylindrical portion of the vessel shell 12 (excluding the rounded ends) has a length L and a diameter D, and the ratio L:D is not greater than about 4:1. In some embodiments, the L:D ratio may be not greater than about 3.5:1, or, not greater than 3:1. In one illustrative embodiment, the vessel shell 12 has a length L of about 40 inches (in.) and a diameter D of about 28 in., providing a L:D ratio of about 40:28, i.e., about 1.4:1. By comparison, a single bed vessel having the same volume of bed space as vessel 10 would have a L:D ratio of more than 4:1, so in the illustrated embodiment, the invention provides a reduction in L:D ratio of at least 65%. In other embodiments of this invention, a reduction of the L:D ratio of up to about 75% can be provided relative to a single bed vessel having an L:D ratio of greater than 4:1. Various embodiments can provide a reduction in L:D ratio of about 10% to about 75%, including all % values therein, relative to a vessel having a L:D ratio greater than 4:1 as is typical for prior art, single bed vessels.

While the vessel shell 12 is described as having an L:D ratio not greater than about 4:1, the invention is not limited in this regard, and in other embodiments, the vessel shell may have any desired L:D ratio.

To prepare the vessel 10 for use, the vessel shell 12 is filled with a separation medium 42 through a fill port 36 at the top rounded end 14 of the vessel shell 12. The separation medium 42 first falls into the second bed space 22 to provide a second bed 30 of separation medium and then, when the second bed space 22 is full, additional separation medium entering the vessel 10 through the fill port 36 spills over the top edge 18a of the partition 18 into the first bed space 20 to provide a first bed 26 of separation medium. The separation medium 42 is chosen for its selectivity in its adsorptive properties and for its suitability in the contemplated process. Feed gas is introduced into the vessel 10 via the first gas port 32, and enriched output gas is released from the second gas port 34. While vessel 10 is described herein as having only a single fill port at the top of the vessel, the invention is not limited in this regard, and in other embodiments, a gas separation vessel encompassed by this invention may have multiple fill ports, and/or may have one or more fill ports at other locations on the vessel.

In a specific embodiment, the separation medium in the vessel 10 is a carbon molecular sieve material, and the vessel 10 is used in a pressure swing adsorption process that provides a nitrogen ($N_2$)-enriched gas stream as an output gas at second gas port 34. In this process, a nitrogen-containing feed gas mixture 38 (e.g., air) that has been pressurized to a predetermined adsorption pressure (e.g., about 120 psig (pounds per square inch gauge)) is passed under pressure into the vessel 10 via the first gas port 32. As the feed gas permeates upward through the first bed 26 of separation medium 42 comprising carbon molecular sieve material, over the top edge 18a of the partition 18 and then downward through the second bed 30 of carbon molecular sieve material, the separation medium 46 selectively retains oxygen, while nitrogen remains in the gas flow. After a predetermined cycle time, a nitrogen-rich gas mixture is released from the vessel 10 via the second gas port 34 as product gas 40.

In one embodiment, the vessel 10 is used to generate nitrogen gas inside a mine to displace oxygen therein and thus prevent a fire or subsequent flare up after a fire is thought to have been extinguished. Alternatively, the nitrogen-enriched product gas 40 is flowed to a surge or storage tank (not shown) prior to use in a desired application.

Once the product gas 40 is drawn off, the vessel 10 can be depressurized to a predetermined desorption pressure (e.g., typically ambient pressure) such that the more readily adsorbable component of the feed gas mixture 38 (i.e., oxygen) may be removed therefrom to cleanse and recharge the separation medium for use in another cycle.

A vessel 10 as described herein avoids the mechanical design and packaging problems presented by prior art vessels, which provide only a single bed space for separation medium and a single direction of gas flow, and which have large L:D ratios, i.e., greater than 4:1. In contrast, a vessel 10 as described herein and having the same volume of separation medium as a prior art vessel can have, in selected embodiments, less than half the height L of the prior art vessel, with an increase in vessel diameter of only about 35% to about 45% relative to the prior art vessel.

In various embodiments, vessels according to the present invention may provide one or more of the following advantages relative to a prior art vessel. For example, the inventive vessels are shorter, which facilitates their transport in an upright position because the vessels require a smaller overhead clearance for bridges and other obstacles. The shorter vessels can also be installed in a greater range of interior working locations than single bed vessels having the same volume of separation medium, again because they do not require as much head room or ceiling clearance as single bed vessels. The inventive vessels have a lower center of gravity and are therefore safer to transport and more stable in place than prior art vessels. In the inventive vessels, there is less bed material movement in use, with less dusting than in a prior art vessel; bed settling occurs in an area of low process flow; and there is less unused volume in the bed. In addition, there is less consumption of the separation medium if the vessel is used in a cyclic process; and a vessel according to this invention may require less piping in the system because the inlet and outlet are close to each other and the vessel offers ease of assembly with reduced working height.

While the first bed 26 and the second bed 30 are described in relation to FIG. 2 as both containing the same separation medium (carbon molecular sieve material), the invention is not limited in this regard, and in other embodiments, the first bed 26 may contain a different separation medium from the second bed 30. For example, the second bed space 22 may be filled with a zeolite material and, when the second bed space is full, a carbon adsorbent material may be provided to fill the first bed space 20. Furthermore, either the first bed space 20 or the second bed space 22, or both, may hold a hybrid bed of two or more separation media. For example, the first bed space 20 and/or the second bed space 22 may be partially filled with a first separation medium and then a second separation medium that is different from the first may be layered on the first separation medium.

While vessel 10 and the partition 18 therein are described as having cylindrical configurations, this is not a limitation on the invention, and in other embodiments, the vessel and the partition therein may have any other suitable configurations, i.e., such as oval, rectangular, etc. The first and second bed supports may be configured to accommodate the configurations of the first and second bed spaces, respectively.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the scope of this invention and of the appended claims.

What is claimed is:

1. A gas separation vessel comprising:
   a vessel shell;
   a partition inside the vessel shell and mounted on the vessel shell;
   a first bed support mounted on the vessel shell, between the partition and the vessel shell, to define a first bed space formed in part by an inner wall of the vessel shell and an outer wall of the partition, the first bed support being gas permeable;
   a second bed support mounted on the vessel shell, and within the partition, to define a second bed space formed in part by an inner wall of the partition, the second bed support being gas permeable;
   a first gas port located on the vessel shell beneath the first bed support and a second gas port located on the vessel shell beneath the second bed support, the first gas port being configured to permit gas flow upward through the exterior of the vessel shell and the first bed space and the second gas port being configured to permit gas flow downward through the second bed space and the exterior of the vessel shell;
   a first bed of separation medium in the first bed space, wherein the first bed of separation medium fills the entirety of the first bed space; and
   a second bed of separation medium in the second bed space, wherein the second bed of separation medium fills the entirety of the second bed space,
   wherein the first bed space and the second bed space form a single axial flow bed.

2. The gas separation vessel of claim 1, wherein the partition has a generally cylindrical configuration and is mounted in the vessel shell such that the first bed space encircles the second bed space.

3. The gas separation vessel of claim 1, wherein the vessel shell has an oblong configuration having two ends, and wherein the first gas port and the second gas port are positioned near the same end of the vessel shell as each other.

4. The gas separation vessel of claim 1, wherein the vessel shell has an oblong configuration having two ends and a length L and a diameter D, and wherein the ratio L:D is not greater than about 4:1.

5. The gas separation vessel of claim 1, wherein the volume of the first bed space is about the same as the volume of the second bed space.

6. The gas separation vessel of claim 1, wherein the partition has a generally tubular configuration and is mounted in the vessel shell such that the first bed space encircles the second bed space, and wherein the first gas port and the second gas port are positioned near the same end of the vessel shell.

7. The gas separation vessel of claim 6, wherein the vessel shell has a cylindrical portion that has a length L and a diameter D, and wherein the ratio L:D is not more than about 4:1.

8. The gas separation vessel of claim 7, wherein the volume of the first bed space is about the same as the volume of the second bed space.

9. The gas separation vessel of claim 1, wherein the first separation medium comprises the same material as the second separation medium.

10. The gas separation vessel of claim 1, wherein the first separation medium comprises a different material from the second separation medium.

11. The gas separation vessel of claim 10, wherein the first separation medium comprises a carbon adsorbent medium and the second separation medium comprises a zeolite.

12. A method for separating intermixed gases, comprising:
   providing a gas separation vessel as defined in claim 1;
   introducing a feed gas that comprises intermixed gases into the gas separation vessel to flow through the first bed and then through the second bed to enable the separation media to preferentially retain at least one of the intermixed gases while preferentially permitting a second gas to flow therethrough; and
   collecting output gas, which contains a smaller proportion of the retained gas than the feed gas, from the gas separation vessel.

13. The method of claim 12, comprising flowing the feed gas through a first bed of a carbon adsorbent medium and a second bed of a zeolite.

* * * * *